United States Patent

Troster

[11] 3,853,884
[45] Dec. 10, 1974

[54] BENZOXANTHENE AND BENZOTHIOXANTHENE DYESTUFFS

[75] Inventor: Helmut Troster, Frankfurt am Main, Germany

[73] Assignee: Hoechst Aktiengesellschaft, Frankfurt am Main, Germany

[22] Filed: Aug. 2, 1973

[21] Appl. No.: 384,785

[30] Foreign Application Priority Data
Aug. 4, 1972 Germany............................ 2238330

[52] U.S. Cl................. 260/287 R, 8/54.2, 8/178 R, 8/179, 252/301.2 R, 260/37 P, 260/40 R, 260/288 R
[51] Int. Cl............................................ C07d 35/32
[58] Field of Search..................... 260/287 R, 288 R

[56] References Cited
UNITED STATES PATENTS
3,376,303   4/1968   Fuchs et al. ....................... 260/288

*Primary Examiner*—G. Thomas Todd
*Attorney, Agent, or Firm*—Curtis, Morris & Safford

[57] ABSTRACT

Dyestuffs consisting of the mixture of isomers of the formula I

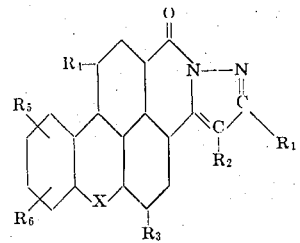

and

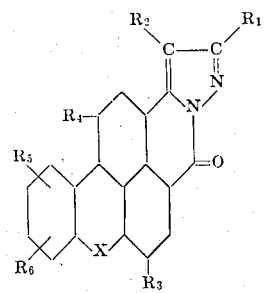

wherein X is oxygen or sulfur, $R_1$ is hydrogen, alkyl having 1 to 20 carbon atoms, methoxycarbonylmethyl, ethoxycarbonylmethyl, lower alkoxycarbonyl or phenyl, $R_2$ is alkoxycarbonyl having 1 to 20 carbon atoms, lower acyl or benzoyl, cyano, carbonamido or phenylcarbonamido, $R_3$ and $R_4$ represent simultaneously hydrogen or lower alkoxy or $R_3$ is lower alkoxy and $R_4$ is hydrogen, $R_5$ and $R_6$ are hydrogen or halogen atoms, lower alkyl, alkoxy or alkoxycarbonyl. These dyestuffs yield brilliant yellow to red dyeings in synthetic polymers especially in polyethylene terephthalate with an intense yellow green to orange fluorescence. Due to their high fluorescence they can also be used for preparing daylight fluorescent pigments.

8 Claims, No Drawings

BENZOXANTHENE AND BENZOTHIOXANTHENE DYESTUFFS

The present invention relates to novel valuable dyestuffs consisting of the mixture of isomers of the formula I

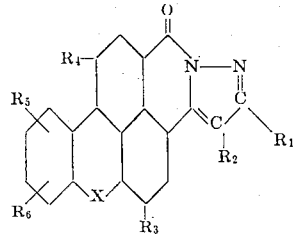

and

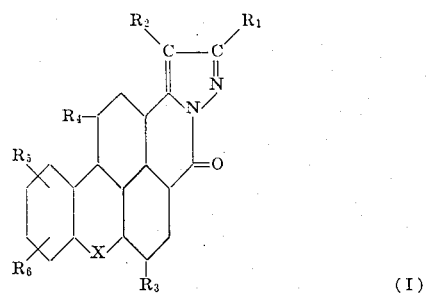

(I)

wherein X is oxygen or sulfur, $R_1$ is hydrogen, alkyl having 1 to 20 carbon atoms, methoxycarbonylmethyl, ethoxycarbonylmethyl, lower alkoxycarbonyl or phenyl, $R_2$ is alkoxycarbonyl having 1 to 20 carbon atoms, lower acyl or benzoyl, cyano, carbonamido or phenylcarbonamido, $R_3$ and $R_4$ represent simultaneously hydrogen or lower alkoxy or $R_3$ is lower alkoxy and $R_4$ is hydrogen, $R_5$ and $R_6$ are hydrogen or halogen atoms, lower alkyl, alkoxy or alkoxycarbonyl, as well as to a process for preparing these dyestuffs.

Preferred compounds are those of the formula I, wherein $R_1$ is lower alkyl, $R_2$ is alkoxycarbonyl having 1 to 20 carbon atoms, $R_5$ and $R_6$ are hydrogen or lower alkoxy and X, $R_3$ and $R_4$ have the above meaning.

The novel dyestuffs are obtained if a benzoxanthene or benzothioxanthene-dicarboxylic acid hydrazide of the formula II

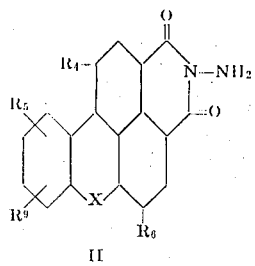

II is converted with a compound of the formula III $$R_1-COCH_2-R_2$$

(III)

in the presence of acidic condensation agents into a hydrazone of the formula IV

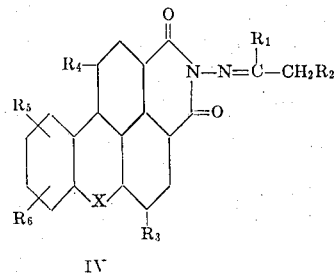

IV whereby in the formulae II, III and IV the substituents $R_1$, $R_2$, $R_3$, $R_4$, $R_5$ and $R_6$ as well as X have the above meanings and this hydrazone is cyclized in the presence of basic condensation agents.

To prepare the dyestuffs the starting compound II is reacted with at least equivalent amounts of the methyleneactive component III in the presence of about 0.01 to 0.1 mol of an acidic condensation agent per mol of the starting compound at an elevated temperature.

Condensation can be effected either in a suitable organic solvent such as for example isobutanol, monomethyl glycol, chlorobenzene, dichlorobenzene, nitrobenzene, dimethyl formamide, N-methyl-pyrrolidone, acetic acid or, with an excess of the compound III at a temperature of from about 100°C to about 200°C, if desired under pressure. The reaction time is between about 30 minutes and 8 hours. In some cases it is suitable to remove the reaction water and other easily volatile by-products from the reaction mixture by distillation or by passing thru an inert gas stream.

After cooling the hydrazone formed can be isolated in usual manner. As acidic condensation agents can be considered aromatic sulfonic acids such as benzene- or toluene-sulfonic acid, alkane-sulfonic acids such as ethane-sulfonic acid, amidosulfonic acid, mineral acids as for example sulfuric or phosphoric acid or gaseous hydrogen chloride. When using protic solvents such as acetic or propionic acid these ones already act as acidic condensation agents.

Examples for compounds of the formula III are acetoacetic acid methyl ester, acetoacetic acid butyl, -isopropyl-, -dodecyl-, -2- ethoxy-ethylesters, butyrylacetic acid ethyl ester, γ-diethylacetoacetic acid ethyl ester, stearoyl-acetic acid ethyl ester, phenylacetoacetic acid ethyl ester, benzoyl- and 4-methoxybenzoylacetic 4-methoxybenzoylacetic acid ethyl ester, oxalylacetic acid diethyl ester, acetyl-acetone, benzoylacetone, γ-dimethylacetylacetone, dibenzoylmethane, γ-ethoxyacetylacetone, acetyl- and benzoylpyruvic acid ethyl ester, acetonedicarboxylic acid dimethyl ester, benzoylacetonitrile, formylacetophenone, acetoacetic acid amide, acetoacetic acid methyl- and diethylamide, acetoacetic acid anilide, -p-anisidide, -3-chloroanilide, -5-chloro-2-toluidide, -o-toluidide, -cyclohexylamide, -octylamide, 2,4-dichlorobenzoylacetic acid.

The ring closure of the hydrazone to form the dyestuff is expediently carried out in an organic solvent such as butanol, isobutanol, pyridine, dimethyl sulfoxide, suitably in acid dialkyl amides, as for example dimethyl formamide, formamide, dimethyl acetamide, hexamethyl-phosphoric acid triamide or N-methylpyrrolidone in the presence of an alkaline compound such as sodium or potassium acetate, potassium carbonate or hydroxide, piperidine, morpholine or triethyl amine at temperatures of from about 80° to about 180°C, if desired under pressure.

If the hydrazone has already been prepared in an organic solvent of the above-mentioned type, it may be cyclized without previous isolation directly in the reaction mixture after neutralizing the acidic condensation agent by addition of one of the bases mentioned. The dyestuff crystallized can be separated in usual manner.

The benzoxanthene and benzothioxanthene-dicarboxylic acid hydrazides of the formula II used as starting compounds are known from German Patent Specification No. 1,297,259, U.S. Pat. No. 3,357,985, British Patent Specification No. 1,245,478 and German Offenlegungsschrift No. 2,008,491.

The novel dyestuffs obtained according to the invention are very suitable for dyeing synthetic materials such as acetyl cellulose, polyamides and especially polyethyleneglycol-terephthalate. Brilliant yellow to red dyeings were obtained having not only a good fastness to light but also an excellent fastness to sublimation. Due to their high fluorescence the products of the invention are very suitable for preparing daylight fluorescent pigments. They may also be used as fluorescent dyestuffs for dyeing synthetic polymers such as polystyrene, polymethacrylate and polyvinyl chloride. They yield in these materials yellow to red shades, which have an intense yellow green to orange fluorescence and are distinguished by a high resistance to heat and to light. Another field of application is the dyeing of synthetic fibreforming polymers such as polyethyleneglycol terephthalate in the mass.

Furthermore a big part of the products of the invention is very suitable for dyeing synthetic materials from organic solvents such as perchloroethylene.

The following Examples illustrate the invention.

EXAMPLE 1 a. 20.0 Grams of benzothioxanthene-3,4-dicarboxylic acid hydrazide and 0.5 g of toluene-sulfonic acid were stirred for 1 hour at 135°–140°C in 120 g of acetoacetic acid ethyl ester, while passing thru a weak nitrogen stream. After cooling the reaction mixture was diluted with 140 ml of methanol, the orange hydrazone formed was suction-filtered, washed with methanol and dried.

b. A mixture of 11.0 g of the hydrazone obtained according to a), 110 ml of dimethyl formamide and 0.11 g of anhydrous potassium acetate was heated for 30 minutes to the boiling point. After cooling the crystallized red mixture of dyestuff isomers of the formula

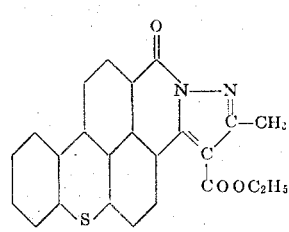 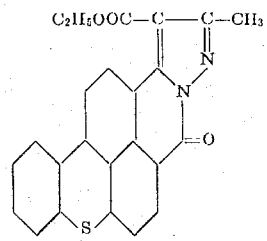

was suction-filtered, washed with methanol and water and dried. The compound recrystallized from dimethyl formamide yielded the following values

```
Calc:  C 72.2   H 3.7   N 7.3   S 8.4
Found: C 71.9   H 3.9   N 7.7   S 8.3
```

Polystyrene and polymethacrylate materials could be dyed with this dyestuff in strongly fluorescent orange red shades having a good fastness to light and a very good resistance to temperature.

EXAMPLE 2 a. 20.0 Grams of 10-methoxybenzoxanthene-3,4-dicarboxylic acid hydrazide, 150 g of acetyl acetone and 0.2 g of toluene-sulfonic acid were condensed according to Example 1a) to form the corresponding hydrazone.

b. 23.0 Grams of this hydrazone were cyclized in 200 ml of N-methylpyrrolidone in the presence of 0.23 g of anhydrous potassium acetate according to Example 1b) to give the orange red mixture of isomers of the formula

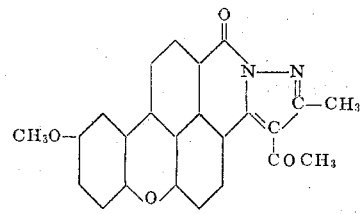

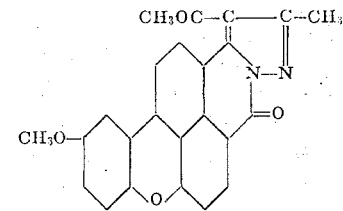

Instead of potassium acetate the same amount by weight of piperidine or morpholine could be used for cyclization. This dyestuff dyed polystyrene and polymethacrylate in brilliant orange yellow shades having an intense fluorescence. The dyeings had a high thermal stability and a very good fastness to light.

EXAMPLE 3 a. 9.5 Grams of benzothioxanthene-3,4-dicarboxylic acid hydrazide, 25.0 g of acetone-dicarboxylic acid dimethyl ester and 0.05 g of toluene-sulfonic acid were refluxed at the boil for 8 hours in 130 ml of chlorobenzene. The organge hydrazone formed was isolated in known manner.

b. 9.2 Grams of the hydrazone obtained according to Example 3a) were heated in 46 ml of dimethyl formamide after addition of 0.09 g of anhydrous potassium acetate for 15 minutes to 145°–150°C. After cooling the mixture was diluted with methanol and the red orange dyestuff mixture of the formula

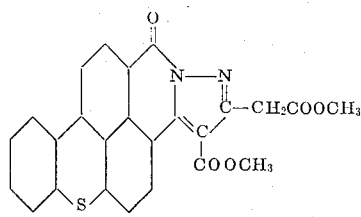

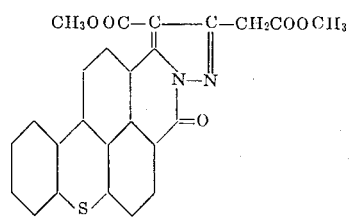

was isolated in known manner. On polyester materials clear orange dyeings fast to sublimation were obtained with this dyestuff.

EXAMPLE 4 a. A mixture of 16.6 grams of 6-methoxybenzoxanthene-3,4-dicarboxylic acid hydrazide, 96 g of stearoyl acetic acid ethyl ester and 0.16 g of toluene-sulfonic acid was stirred for 10 hours at 175°C. At room temperature the orange yellow solution was diluted with 100 ml of butyl acetate and the mixture was stirred for several hours.

The yellow hydrazone which crystallized was isolated in known manner.

b. 15.0 Grams of the hydrazone obtained according to a) were condensed in 75 ml of dimethyl formamide in the presence of 0.15 g of anhydrous potassium acetate in 15 minutes at 145°–150°C to give the mixture of dyestuff isomers of the formula

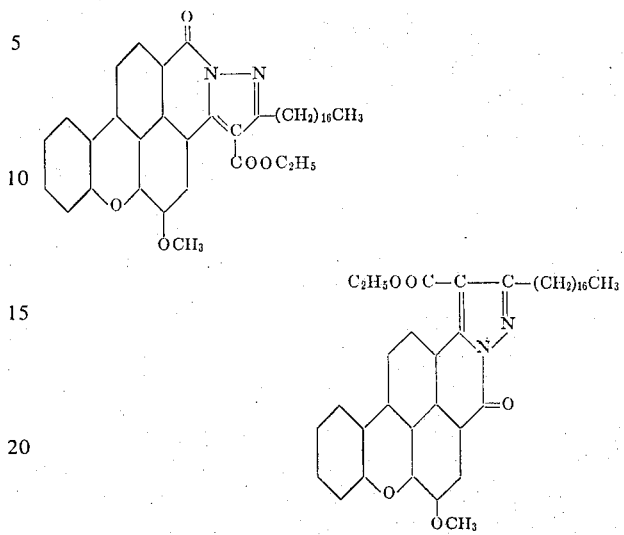

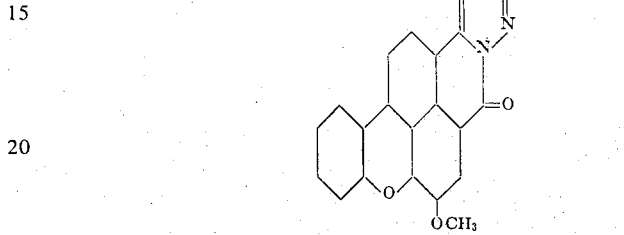

The orange yellow product very well soluble in aromatic solvents dyed rigid PVC in intensely fluorescent orange yellow shades having a good fastness to light and a very good thermal stability.

The following Table lists further dyestuffs which are obtained according to the methods described in the above Examples.

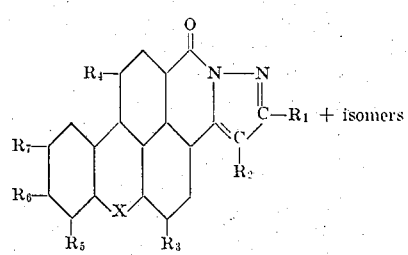

| Example | $R_1$ | $R_2$ | $R_3$ | $R_4$ | $R_5$ | $R_6$ | $R_7$ | X | Shade (polystyrene) |
|---|---|---|---|---|---|---|---|---|---|
| 5 | —CH$_3$ | —COCH$_3$ | H | H | H | H | H | O | Orange yellow. |
| 6 | —CH$_3$ | —COCH$_3$ | —OCH$_3$ | H | H | H | H | O | Orange. |
| 7 | —CH$_3$ | —COCH$_3$ | —OCH$_3$ | H | H | H | —OCH$_3$ | O | Orange red. |
| 8 | —CH$_3$ | —COOC$_2$H$_5$ | H | H | H | H | —OCH$_3$ | O | Orange. |
| 9 | —CH$_3$ | —COOC$_2$H$_5$ | —OCH$_3$ | H | H | H | H | O | Orange red. |
| 10 | —CH$_3$ | —COOC$_2$H$_5$ | —OCH$_3$ | H | H | H | —OCH$_3$ | O | Red orange. |
| 11 | —(CH$_2$)$_3$CH$_3$ | —COOC$_2$H$_5$ | H | H | H | H | H | O | Orange yellow. |
| 12 | —(CH$_2$)$_{16}$CH$_3$ | —COOC$_2$H$_5$ | H | H | H | H | —OCH$_3$ | O | Orange. |
| 13 | —CH$_3$ | —COO(CH$_2$)$_2$OCH$_3$ | H | H | H | H | —OCH$_3$ | O | Do. |
| 14 | —CH$_3$ | —COO(CH$_2$)$_{11}$CH$_3$ | H | H | H | H | H | O | Orange yellow. |
| 15 | —CH$_3$ | —COO(CH$_2$)$_{11}$CH$_3$ | H | H | H | H | —OCH$_3$ | O | Orange. |
| 16 | —CH$_3$ | —COO(CH$_2$)$_{15}$CH$_3$ | H | H | H | H | —OCH$_3$ | O | Do. |
| 17 | —CH$_3$ | —COO(CH$_2$)$_{15}$CH$_3$ | —OCH$_3$ | H | H | H | —OCH$_3$ | O | Orange red. |
| 18 | —CH$_3$ | —COO(CH$_2$)$_{17}$CH$_3$ | H | H | H | H | —OCH$_3$ | O | Orange. |
| 19 | —CH$_3$ | —COO(CH$_2$)$_{17}$CH$_3$ | —OCH$_3$ | H | H | H | —OCH$_3$ | O | Orange red. |
| 20 | —CH$_2$COOCH$_3$ | —COOC$_2$H$_5$ | H | H | H | H | H | O | Orange yellow. |
| 21 | —CH$_2$COOCH$_3$ | —COOCH$_3$ | H | H | H | H | —OCH$_3$ | O | Orange. |
| 22 | —CH$_2$COOCH$_3$ | —COOCH$_3$ | —OCH$_3$ | H | H | H | —OCH$_3$ | O | Orange red. |
| 23 | —COOC$_2$H$_5$ | —COOC$_2$H$_5$ | H | H | H | H | —OCH$_3$ | O | Orange. |
| 24 | —COOC$_2$H$_5$ | —COOC$_2$H$_5$ | —OCH$_3$ | H | H | H | —OCH$_3$ | O | Orange red. |
| 25 | —C$_6$H$_5$ | —COCH$_3$ | H | H | H | H | —OCH$_3$ | O | Orange. |
| 26 | —CH$_3$ | —COCH$_3$ | H | H | H | H | H | S | Orange red. |
| 27 | —CH$_3$ | —COCH$_3$ | H | H | H | Cl | H | S | Do. |
| 28 | —CH$_3$ | —COCH$_3$ | —OCH$_3$ | H | H | H | H | S | Bluish red. |
| 29 | —CH$_3$ | —COOC$_2$H$_5$ | —OCH$_3$ | H | H | H | H | S | Do. |
| 30 | —CH$_3$ | —COOC$_2$H$_5$ | —OCH$_3$ | H | H | —OCH$_3$ | H | S | Red. |
| 31 | —CH$_3$ | —COOC$_2$H$_5$ | —OCH$_3$ | —OCH$_3$ | H | H | H | S | Red violet. |
| 32 | —CH$_3$ | —COOC$_2$H$_5$ | H | H | H | —CH$_3$ | —CH$_3$ | S | Red. |
| 33 | —CH$_3$ | —COOC$_2$H$_5$ | H | H | —CH$_3$ | H | H | S | Orange red. |
| 34 | —CH$_3$ | —COOC$_2$H$_5$ | H | H | H | Br | H | S | Do. |
| 35 | —CH$_3$ | —COOCH$_3$ | H | H | H | H | H | S | Do. |
| 36 | —CH$_3$ | —COOC$_4$H$_9$ | H | H | H | H | H | S | Do. |

Continued

| Example | R₁ | R₂ | R₃ | R₄ | R₅ | R₆ | R₇ | X | Shade (polystyrene) |
|---|---|---|---|---|---|---|---|---|---|
| 37 | —CH₃ | —COOCH₂CH(CH₂)₃CH₃ <br>                  \|<br>                  C₂H₅ | H | H | H | H | H | S | Do. |
| 38 | —CH₃ | —COO(CH₂)₁₁CH₃ | H | H | H | H | H | S | Do. |
| 39 | —CH₃ | —COO(CH₂)₁₁CH₃ | —OCH₃ | H | H | H | H | S | Bluish red. |
| 40 | —CH₃ | —COO(CH₂)₁₆CH₃ | H | H | H | H | H | S | Orange red. |
| 41 | —CH₃ | —COO(CH₂)₁₆CH₃ | —OCH₃ | H | H | H | H | S | Bluish red. |
| 42 | —(CH₂)₁₅CH₃ | —COOC₂H₅ | H | H | H | H | H | S | Orange red. |
| 43 | —CH₂COOCH₃ | —COOCH₃ | —OCH₃ | H | H | H | H | S | Bluish red. |
| 44 | —COOC₂H₅ | —COOC₂H₅ | H | H | H | H | H | S | Red orange. |
| 45 | —COOC₂H₅ | —COOC₂H₅ | —OCH₃ | H | H | H | H | S | Bluish red. |
| 46 | —CH₃ | —CONH—⌬ | H | H | H | H | H | S | Orange red. |
| 47 | ⌬ | —COCH₃ | H | H | H | H | H | S | Do. |
| 48 | Same | —COCH₃ | —OCH₃ | H | H | H | H | S | Bluish red. |
| 49 | do | —COOC₂H₅ | H | H | H | H | H | S | Orange red. |
| 50 | —CH₃ | —CONH₂ | H | H | H | —COOC₂H₅ | H | O | Do. |
| 51 | —CH₃ | —COOC₂H₅ | H | H | H | —COOC₂H₅ | H | S | Do. |

We claim:

1. Benzoxanthene or benzothioxanthene dyestuffs consisting of a mixture of the compound of the formula

and its corresponding isomer of the formula

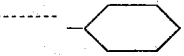

in which formulas X is oxygen or sulfur, $R_1$ is hydrogen, alkyl with 1 to 20 carbon atoms, methoxy carbonylmethyl, ethoxycarbonylmethyl, alkoxycarbonyl with 1 to 4 carbon atoms or phenyl, $R_2$ is alkoxycarbonyl with 1 to 20 carbon atoms, alkanoyl with 1 to 4 carbon atoms, benzoyl, cyano, carbamoyl or phenylcarbamoyl, $R_3$ and $R_4$ are simultaneously hydrogen or alkoxy with 1 to 4 carbon atoms, or $R_3$ is alkoxy with 1 to 4 carbon atoms and $R_4$ is hydrogen and $R_5$ and $R_6$ are hydrogen, chlorine, bromine, alkyl, alkoxy or alkoxycarbonyl each with 1 to 4 carbon atoms.

2. The dyestuff consisting of the mixture of isomers of the formula

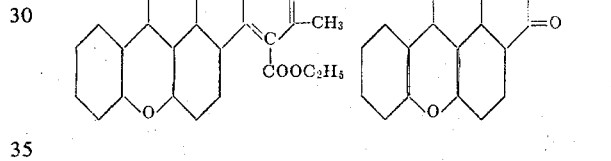

3. The dyestuff consisting of the mixture of isomers of the formula

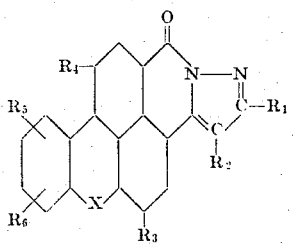

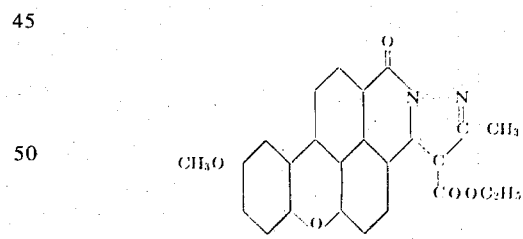

4. The dyestuff consisting of the mixture of isomers of the formula

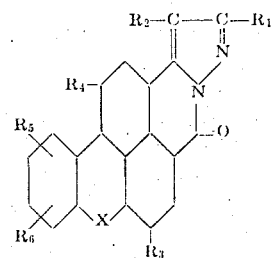

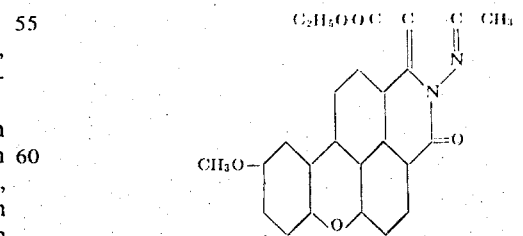

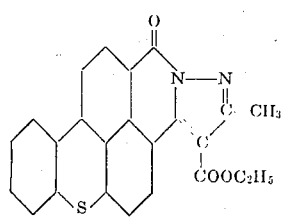
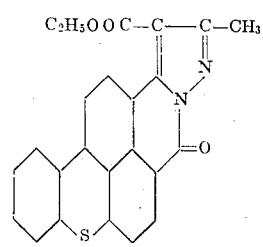
5. The dyestuff consisting of the mixture of isomers of the formula
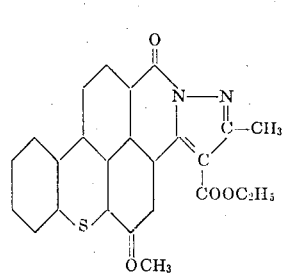   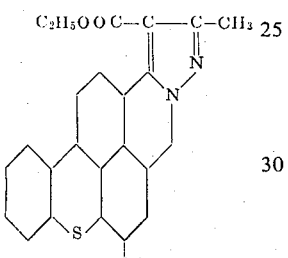
6. The dyestuff consisting of the mixture of isomers of the formula
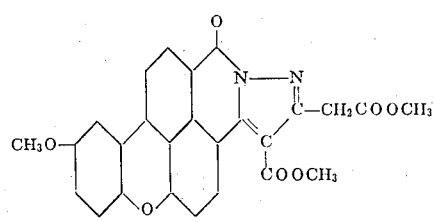
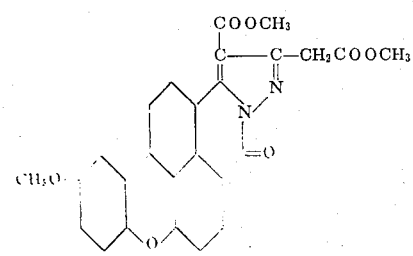
7. The dyestuff consisting of the mixture of isomers of the formula
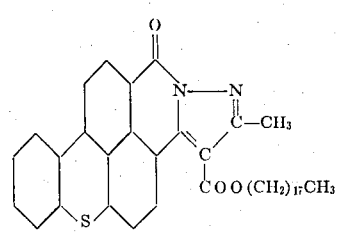
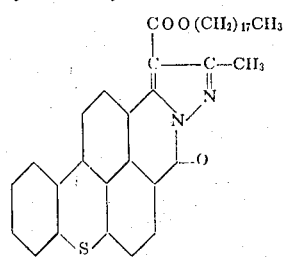
8. The dyestuff consisting of the mixture of isomers of the formula
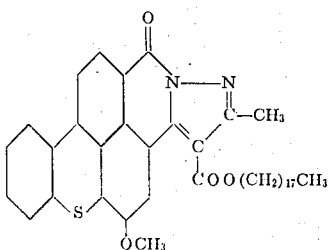
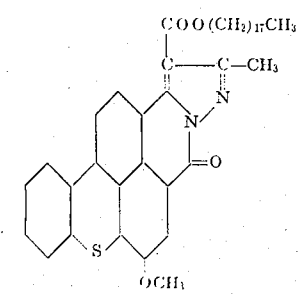
* * * * *